(12) United States Patent
Greer et al.

(10) Patent No.: US 7,169,204 B2
(45) Date of Patent: *Jan. 30, 2007

(54) SEWAGE SLUDGE RECYCLING WITH A PIPE CROSS-REACTOR

(75) Inventors: Gary D. Greer, Soda Springs, ID (US); Gary L. Dahms, Soda Springs, ID (US)

(73) Assignee: Environmental Technologies Capital Partners LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/884,856

(22) Filed: Jul. 6, 2004

(65) Prior Publication Data

US 2005/0279146 A1    Dec. 22, 2005

Related U.S. Application Data

(63) Continuation of application No. 09/735,768, filed on Dec. 12, 2000, now Pat. No. 6,758,879, which is a continuation of application No. 09/416,370, filed on Oct. 12, 1999, now Pat. No. 6,159,263, which is a continuation of application No. 08/852,663, filed on May 7, 1997, now Pat. No. 5,984,992.

(51) Int. Cl.
  *C01B 17/04* (2006.01)
(52) U.S. Cl. .................. 71/11; 71/12; 71/13; 71/15
(58) Field of Classification Search .............. 71/11, 71/12, 13, 15
  See application file for complete search history.

(56) References Cited

U.S. PATENT DOCUMENTS 3,050,383 A * 8/1962 Wilson ................... 71/11
4,427,433 A * 1/1984 Parker et al. ............. 71/34
5,984,992 A * 11/1999 Greer et al. .............. 71/11
6,159,263 A * 12/2000 Greer et al. .............. 71/11
6,758,879 B2 * 7/2004 Greer et al. .............. 71/11

* cited by examiner

*Primary Examiner*—Wayne A. Langel
(74) *Attorney, Agent, or Firm*—Drinker Biddle&Reath LLP

(57) ABSTRACT

An improved process for enhancing the plant nutrient value of relatively low analysis organic waste material (e.g., sewage sludge) involves treating the waste material with an acid and base in a pipe-cross reactor. The process more particularly involves mixing the waste material with water to form a slurry (or initially taking the waste material as a slurry); pumping the slurry to a pipe-cross reactor for reaction with a base, acid, and water to form a melt; spraying the melt onto a recycling bed of fines in a granulator, and flashing off the water contained in the melt as steam; rolling the melt onto recycled fine particles in a granulator to form granulated particles; and drying these granulated particles to form an enhanced plant nutrient value composition (e.g., a fertilizer or soil conditioner having a greater "NPK" value than the original relatively low analysis organic waste material). The invention also includes fertilizers produced according to the improved process, which fertilizers are of the same size and shape and density of commonly used fertilizers. The method advantageously utilizes the heat generated by the exothermic acid-base reaction in the pipe-cross reactor to remove the approximately 80% water from sludge, thus saving large amounts of energy normally used in conventional drying or burning methods, while, at the same time, conserving the intrinsic values of the nutrients and humates contained in the sludge. In one embodiment, the process includes a method of disposing of spent acid from a hot dip galvanizing process or a steel pickling process involving incorporating the spent acid to maintain the low pH of a venturi scrubber used in the improved process.

5 Claims, 2 Drawing Sheets

SEWAGE SLUDGE RECYCLING WITH A PIPE CROSS-REACTOR

CROSS-REFERENCE TO RELATED APPLICATIONS

Continuation Prior application Ser. No. 09/735,768 filed Dec. 12, 2000, now U.S. Pat. No. 6,758,879, which is a Continuation of U.S. patent application Ser. No. 09/416,370 filed Oct. 12, 1999, now U.S. Pat. No. 6,159,263, which is a Continuation of U.S. patent application Ser. No. 08/852,663 filed May 7, 1997, now U.S. Pat. No. 5,984,992.

TECHNICAL FIELD

This invention relates generally to a method of treating organic material to create a fertilizer. More specifically, the invention relates to the treatment of organic material, such as sewage sludge, with an acid and base in a pipe-cross reactor.

BACKGROUND

The disposal of sewage sludge is a problem. Current methods of disposing of sewage sludge include incineration, direct land or ocean application, heating and drying the sludge for sterilization and then applying it to the land, depositing it in a landfill, or granulating it with a standard rotary granulator, with heating and drying being provided by exogenous heat sources (e.g. by burning purchased fuel). While some of these methods result in what is termed a "fertilizer", such fertilizer is of relatively low analysis with regard to its "plant nutrient value".

Methods of expressing a fertilizer's "plant nutrient value" involve identifying the fertilizer's "NPK" value, wherein N relates to the amount of nitrogen, P relates to the amount of phosphorus (expressed as $P_2O_5$), and K relates to the amount of potassium (expressed as $K_2O$). Thus, as reported by Wilson in U.S. Pat. No. 3,050,383 (Aug. 21, 1962), sewage sludge with a 2.5-2.5-0 value contains two and a half percent nitrogen, two and a half percent phosphorous as $P_2O_5$, and zero percent potassium as $K_2O$. Except as otherwise indicated by usage, all percentage values used herein are weight-based percentages (i.e., w/w).

Fortunately, methods exist for enhancing the nutrient value of relatively low analysis organic waste material. For instance, in the aforementioned Wilson patent (the contents of the entirety of which are incorporated by this reference), a method is disclosed for treating dried animal manure and sewage sludge with controlled amounts of an acid, such as sulfuric acid, phosphoric acid (or an equivalent phosphorous compound, the strength of which is expressed as phosphoric acid), or mixtures thereof, and an aqueous ammoniacal solution, such as aqueous ammonia or ammoniacal nitrogen salt-containing solutions and tumbling the resulting reaction mass to form fertilizer granules having an "upgraded" or "enhanced" plant nutrient value.

Other methods of enhancing the plant nutrient value of relatively low analysis organic waste material with acids, bases, or mixtures thereof have also been described. See, e.g., U.S. Pat. No. 4,743,287 (May 10, 1988) to Robinson, U.S. Defensive Publication T955,002 (Feb. 1, 1977) to Norton et al., U.S. Pat. No. 5,466,273 (Nov. 14, 1995) to Connell, U.S. Pat. No. 5,125,951 (Jun. 30, 1992) to Lahoda et al., U.S. Pat. No. 5,118,337 (Jun. 2, 1992) to Bleeker, U.S. Pat. No. 5,393,317 (Feb. 28, 1995) to Robinson, and U.S. Pat. No. 5,422,015 (Jun. 6, 1995) to Angell et al.

A further drawback of sludges treated in conventional manners (e.g., by drying and screening) is that they are usually of insufficient size and shape to be spread by commonly used agricultural fertilizer spreaders, and cannot be used in the newer pneumatic spreaders.

It would be an improvement in the art if a relatively simple process existed for processing relatively low analysis organic waste material to an enhanced plant nutrient value composition, especially if such a process yielded a product which was sized and shaped to be spread by presently commercially available spreaders.

DISCLOSURE OF THE INVENTION

The invention includes an improved process for enhancing the plant nutrient value of relatively low analysis organic waste material, such as sewage sludge. The improvement involves exothermically treating the relatively low analysis organic waste material with an acid and a base in a pipe-cross reactor.

More particularly, the improved process involves mixing the relatively low analysis organic waste material with water to form a slurry (or taking the waste material as a slurry); pumping the slurry to a pipe-cross reactor for reaction with a base, acid, and water to form a melt; spraying the melt onto a recycling bed of fines, and flashing off the water contained in the melt as steam. The melt is then rolled onto a substrate such as recycled fine particles in a granulator to form granulated particles, causing the granulated particles to grow in size (e.g., to form granules). These granulated particles are then dried (e.g., with a rotary dryer) to reduce their moisture content, and form an enhanced plant nutrient value composition (e.g., a fertilizer or soil conditioner having a greater NPK value than the original relatively low analysis organic waste material).

Generally, the process will also include passing the dried granulated particles to a separation apparatus and separating the dried granulated material into fines, product, and oversized material, and further includes grinding the oversized material and returning the fines and oversized material to the granulator for use as a granular substrate. Potash and other micronutrient materials may be added as dry material to the returning fines for further enhancement of the product.

The invention also includes fertilizer produced according to the improved process. Fertilizers produced by the instant invention are of the same size and shape and density of commonly used fertilizers.

An advantage of the method is that it uses the heat generated by the exothermic acid-base reaction in the pipe-cross reactor to remove the approximately 80% water from sludge, thus saving large amounts of energy normally used in conventional drying or burning methods, while, at the same time, conserving the intrinsic values of the nutrients and humates contained in the sludge. The method also handles the processed material as a slurry, thus avoiding the nuisance of conveying and handling dry or solid materials. The method also achieves high temperatures which aids in the destruction of pathogens.

In one embodiment, the process includes a method of disposing of spent acid from a hot dip galvanizing process or a steel pickling process comprising incorporating the spent acid to maintain the low pH of a venturi scrubber used in the improved process thus producing a micronutrient enriched fertilizer.

BEST MODE OF THE INVENTION

Figure 1:
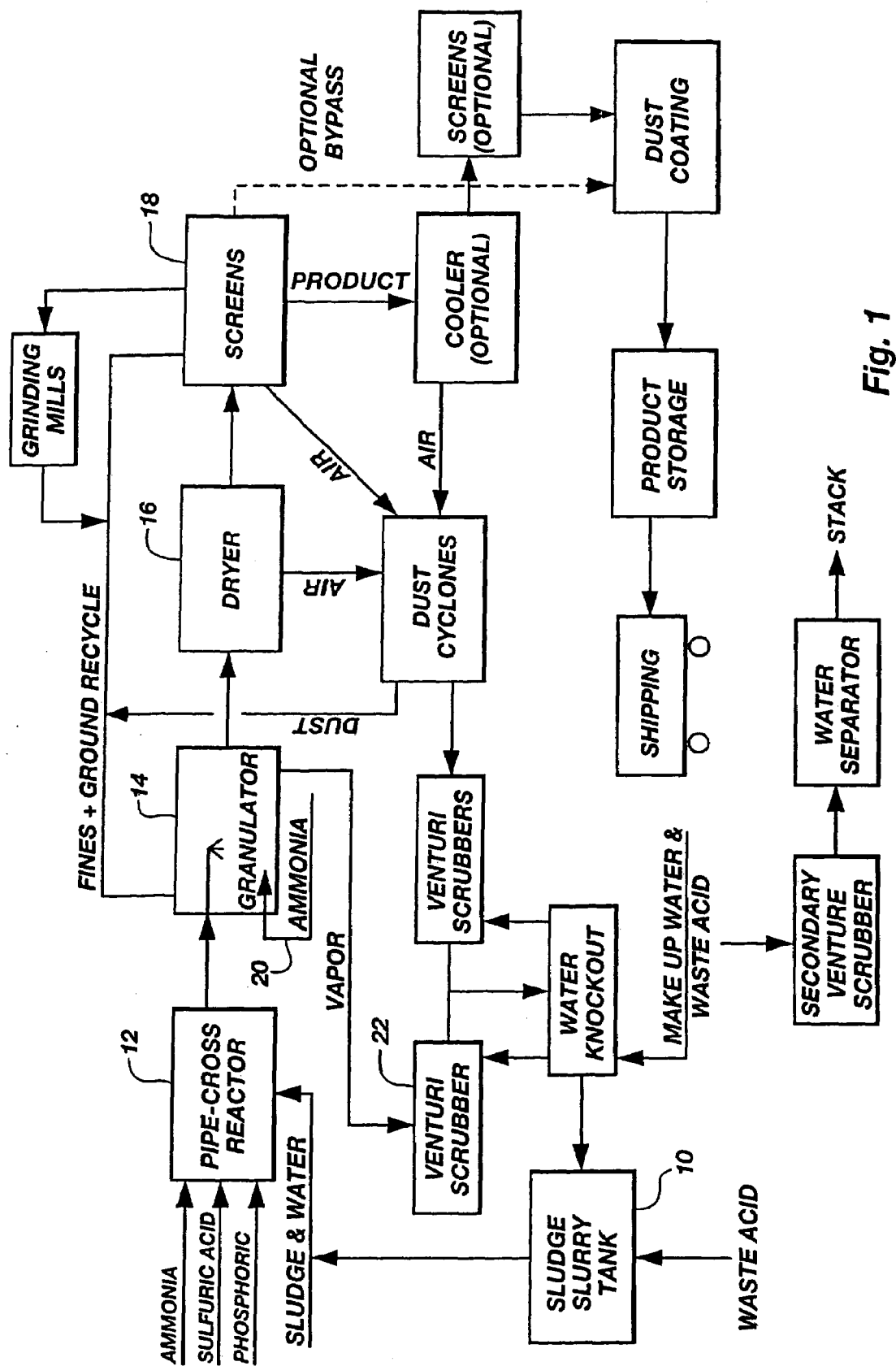
FIG. 1 is a process flow diagram, showing a process according to the invention.

As depicted in FIG. 1, an improved process for enhancing the plant nutrient value of organic waste material generally involves mixing the organic waste material with water in an agitation tank or sludge slurry tank 10 to form a slurry. The water used in making the slurry preferably includes scrubber water from the hereinafter described scrubbers 22, which includes waste acid. The slurry is mixed at a sufficient concentration and consistency that it will optimally process the organic waste material as quickly as possible, but will not clog or block the pipe-cross reactor 12 during operation. Of course, the particular slurry concentrations and consistencies will depend, to some extent, on the size and amount of insoluble particulate material contained in the particular organic waste material, and the size and length of the pipe-cross reactor components.

The slurry is pumped from the agitation tank 10 to a pipe-cross reactor 12 for an exothermic reaction with, for example, a base such as ammonia, and an acid or acids such as sulfuric acid, phosphoric acid, and mixtures thereof, with or without extra water to form a melt.

Pipe-cross reactors are well-known, and have been used in the past to produce granular NPKS fertilizers from liquid chemicals. See, e.g., *Energy Efficient Fertilizer Production with the Pipe-Cross Reactor*, (U.S. Dept. of Energy, 1982) (a pipe-cross reactor fit into the granulator drum of a conventional ammoniation-granulation system); Achorn et al., "Optimizing Use of Energy in the Production of Granular Ammonium Phosphate Fertilizer" (1982 Technical Conference of ISMA, Pallini Beach, Greece); British Sulfur Corp. Ltd., "TVA modifies its pipe reactor for increased versatility", *Phosphorus & Potassium*, No. 90, pp. 25–30 (1977); Achorn et al., "Efficient Use of Energy in Production of Granular and Fluid Ammonium Phosphate Fertilizers" (1982 Fertilization Association of India Seminar, New Dehli, India); Salladay et al. "Commercialization of the TVA Pipe-Cross Reactor in Regional NPKS and DAP Granulation Plants in the United States" (1980 Fertilization Association of India Seminar, New Dehli, India); U.S. Pat. No. 4,619,684 (Oct. 28, 1986) to Salladay et al.; U.S. Pat. No. 4,377,406 (Mar. 22, 1983) to Achorn et al.; U.S. Pat. No. 4,134,750 (Jan. 16, 1979) to Norton et al.; U.S. Defensive Publication T969,002 (Apr. 4, 1978) to Norton et al; and Salladay et al. "Status of NPKS Ammoniation-Granulation Plants and TVA Pipe-Cross Reactor" (1980 Fertilizer Industry Round Table, Atlanta, Ga., US).

Amounts of acid and base used in the exothermic process can be determined by one of skill in the art. However, for guidance in the neutralization of ammonia, approximately one mole of sulfuric acid, or of phosphoric compounds expressed as phosphoric acid, is used for each two moles of ammonia. Concerning the concentration of phosphoric acid, typical molar ratios of N:P in the pipe-cross reactor are between 1.3:1 to 1.8:1, preferably 1.4:1 and 1.5:1, taking into consideration water dilution of the phosphoric acid to between about forty-two to forty-seven percent (42 to 47%) $P_2O_5$. The molar amount of nitrogen should take into consideration not only the amount of ammonia being added, but the typical amount of ammoniacal nitrogen contained in the particular organic waste material.

Other acids which may be used with the invention include nitric acid, hydrochloric acid, acetic acid, citric acid and mixtures thereof. Certain combinations (e.g., nitric acid and an ammonia compound which might form ammonium nitrate which may be explosive) need to be carefully considered before use however. Whatever the acid or acids chosen, the strength of one of the acids used in the process will preferably be equivalent to 90% sulfuric acid (e.g., 93 to 100 percent sulfuric acid).

Figure 2:
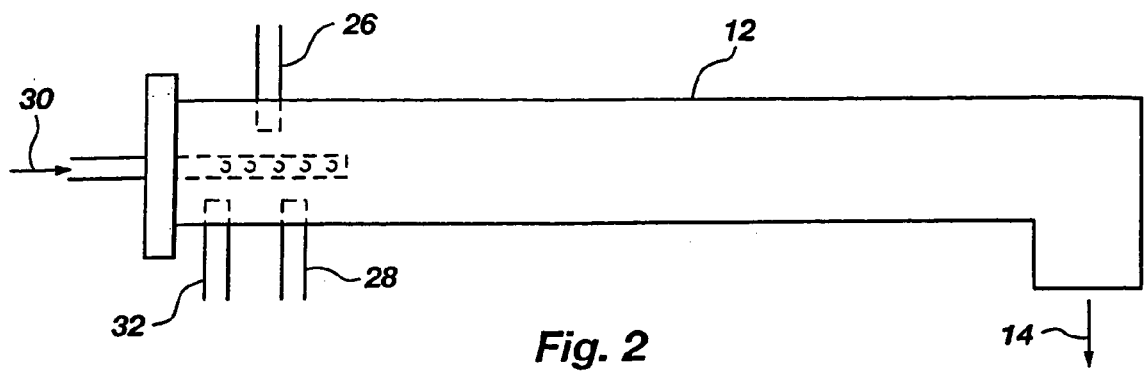
FIG. 2 is a stylized view of a pipe-cross reactor for use with the invention.
Figure 3:
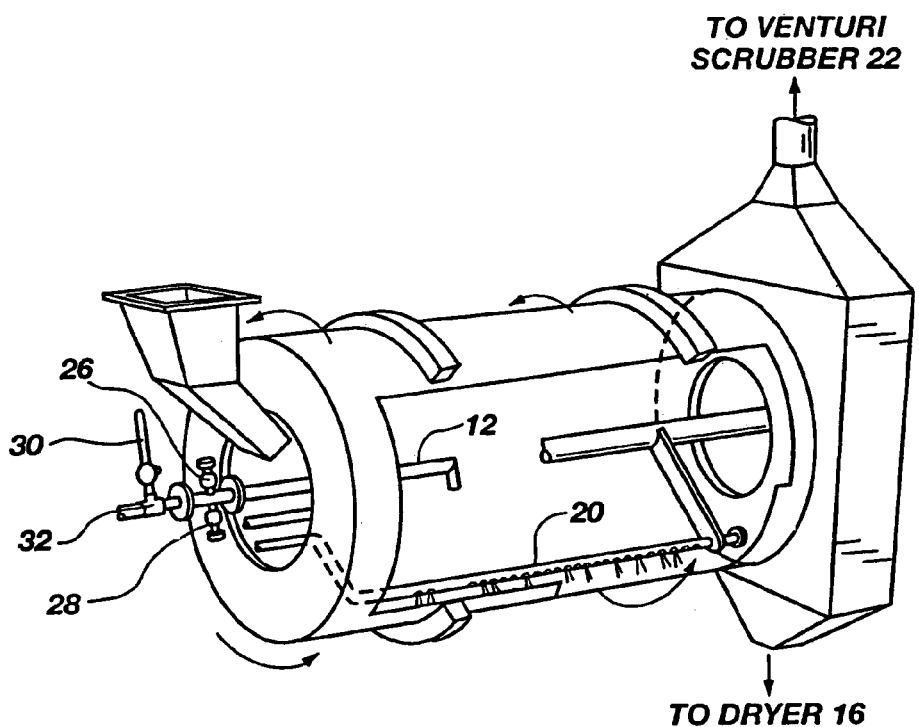
FIG. 3 is a partially cut away, perspective view of a pipe-cross reactor in a rotary ammoniator-granulator for use in practicing the invention.
Figure 4:
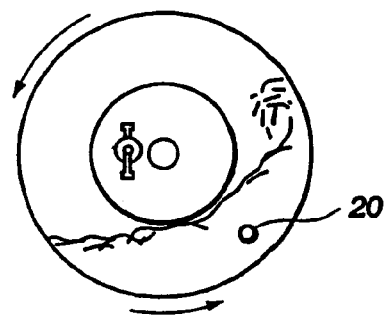
FIG. 4 is a stylized end view of a rotating bed of materials in a granulator for use with the invention.

As depicted in FIG. 2, the pipe-cross reactor 12 is preferably provided with two cross pipes 26, 28 to receive sulfuric acid (at a rate of about 8.6 gpm) and phosphoric acid (at a rate of from about 2.6 gpm). A third pipe 30 incorporates the ammonia into the center of the reactor. The length of this pipe 30 should be at least twenty (20) to thirty (30) inches to ensure adequate mixing. A third cross pipe 32 incorporates the slurry and additional water into the mixing chamber. A typical pipe-cross reactor for use with the invention has a diameter of approximately three (3) to ten (10) inches, is from about seven (7) to about fifty (50) feet long, and terminates in a, for example, two (2) to eight (8) inch discharge pipe (or a slot of equivalent cross-sectional area), preferably with a stainless steel insert or TEFLON™ lining. The discharge pipe preferably discharges into a standard rotating drum granulator 14. It is preferably made of a steel pipe (e.g., HASTELLOY C-276 or 316L stainless steel (with HASTELLOY C or B for the reaction tube)). A TEFLON™, ceramic, or other corrosion resistant lining may also be used in the pipe-cross reactor. The temperature is preferably maintained below 149° C. (300° F.).

The ammonia is introduced into the system at a rate of from about 4.3 gpm. Organic waste material (e.g., sewage sludge) and water are incorporated at a rate of from about 30 to about 40 gpm of slurry. The pipe-cross reactor is typically operated at a gage pressure of between fifteen (15) and sixty (60) psig.

A "hot melt" discharges from the pipe-cross reactor tube into the granulator 14, while water flashes from the reactor product as it issues into the granulator 14. Steam is generated by the exothermic reaction conducted within the pipe-cross reactor 12.

A preferred granulator (also commonly known as an "ammoniator-granulator") is a two (2) to four (4) meter (e.g., six (6) to twelve (12) feet) diameter rotating drum granulator having a length of from about five (5) to about seven (7) meters. In the depicted process, the granulator 14 includes an ammonia sparger 20 operably positioned within the granulator 14 for the addition of small amounts of ammonia to the melt to, for example, control or adjust the pH of the granulated material.

The melt is rolled onto recycled fine particles within the granulator 14 to form granulated particles, thus causing the granulated particles to grow to a desired size. Afterwards, these granulated particles are passed into a rotary dryer 16 for a sufficient amount of time to reduce their moisture content, thus forming a fertilizer having an enhanced plant nutrient value.

A preferred dryer for use with the invention is a two (2) to three (3) meter (e.g., six (6) to eight (8) feet) diameter rotating drum dryer having a length of from about fifteen

(15) to about seventeen (17) meters, and having a heating capacity of 30 to 45 million BTU/hour, with a lump crusher at the discharge end.

The depicted process further includes passing the dried granulated particles to a separation apparatus or screens 18 and separating the dried granulated material into fines, product and oversized material. Oversized material is reduced in size to be incorporated, as a fine, into the process.

The fines are returned to the granulator 14 (along with potash or any micronutrients required for the desired final product analysis) for incorporation into the process. The product from the separation process is preferably cooled in a product cooler (from two (2) to three (3) meters in diameter, and fifteen to seventeen (17) meters long) or a suitable fluid-bed type cooler.

During the process, fumes from the granulator 14 containing steam, ammonia, and particulate are collected by maintaining a negative pressure inside the granulator 14 by pulling the fumes through a venturi scrubber 22 having low pH water as scrubber water sprayed into the venturi throat. Other aspects of a ventilation system for use with the invention preferably include fans (e.g., ones capable of moving about 60,000 cubic feet per minute of air), dry cyclones for dust collection, and venturi scrubbers with water separation chambers for collecting ammonia fumes and small dust particles.

The invention uses low pH water in the venturi scrubbers to collect unreacted ammonia vapors escaping the granulator. In one embodiment, small amounts of sulfuric or phosphoric acid are added to the venturi scrubbers to maintain a low pH (e.g., 2 to 3) for proper ammonia vapor scrubbing in the venturi scrubbers.

NPK fertilizers generally, however, preferably include the micronutrients iron and zinc. In a preferred embodiment, therefore, spent acid from a hot dip galvanizing (EPA/RCRA hazardous waste designation D002, D006, D007, and D008) or steel pickling process (EPA/RCRA hazardous waste designation K062) is used to maintain the low pH of the scrubber water. These spent acids commonly are sulfuric acid or hydrochloric acid of five (5%) to ten percent (10%) strength, containing three (3) to eight (8) percent iron. Galvanizing spent acid contains three (3) to eight (8) percent zinc along with the previously described iron. The iron and zinc are fed with the ammonia-laden scrubber water from scrubbing to the sludge slurry tank, and on to the pipe-cross reactor for incorporation as iron and zinc micronutrients in the final NPK fertilizer. In the case of spent sulfuric acid, the sulfur also becomes a nutrient in the resulting fertilizer, since it reacts in the pipe-cross reactor to form ammonium sulfate (while hydrochloric acid goes to form ammonium chloride).

Other micronutrients or additional ingredients may be incorporated into the resulting fertilizer by adding them with a weigh feeder as a dry solid to the fines recycle stream. "Micronutrients" or "additional ingredients" include lime, dolomite, calcite, hydrobiotite, gypsum, phosphates (e.g., rock phosphate or ammonium phosphate), potash, urea, soil clays, calcium peroxide, ammonium nitrate, vermiculite, humic acid, and trace minerals such as iron, manganese, magnesium, boron, copper, and zinc.

Although the invention has been most particularly described for the processing of municipal sewage sludge, the inventive process may also be used to enhance the plant nutrient value of other relatively low analysis organic waste material such as poultry manure, food processing wastes, wastes from paper manufacturing, swine manure sludge, mixtures thereof, and the like. In such a case, the particular relatively low analysis organic waste material is substituted for the sewage sludge in the process, and the process parameters are accordingly modified.

The invention is further explained by the following illustrative example:

EXAMPLE

In an agitation tank, 6700 kilograms/hour (7.4 tons/hour) of sewage sludge are mixed with 37 liters per minute (ten gallons/minute (gpm)) of scrubber water from a venturi scrubber to form a slurry. The slurry is of a consistency that it can be pumped with a positive displacement pump or other suitable pump to a pipe-cross reactor equipped to receive ammonia, sulfuric acid, phosphoric acid, sewage sludge, and water. The pipe-cross reactor has a diameter of approximately four (4) inches, and is forty (40) feet long. The pipe-cross reactor terminates in a rotating drum granulator. The rotating drum granulator is six (6) feet in diameter, and is twenty (20) feet long.

The slurry is added to the pipe-cross reactor, and is reacted with 8.6 gpm 99.5% ammonia, 8.6 gpm sulfuric acid (93%), and 2.6 gpm phosphoric acid (54% $P_2O_5$). The temperature of the pipe-cross reactor (due to the exothermic reaction between the acid and the base) is maintained at about 149° C. (300° F.) with moisture in the sludge. This temperature acts to kill *Salmonella*, *E. coli*, and other pathogens which may be found in the slurry. This temperature also acts to deodorize the material somewhat.

The resulting melt from the pipe-cross reactor is sprayed onto a recycling bed of fines, along with 2000 pounds of added potassium chloride (60% $K_2O$) while the water contained in the melt flashes off as steam. An ammonia sparger is provided in the granulator to add small amounts of ammonia to the granulation mixture for pH control.

Operating the pipe-cross reactor in such a manner incorporates approximately 14.8 tons per hour of 20% solid sewage sludge at a ten (10) ton per hour production rate.

Fumes from the granulator containing steam, ammonia and particulate are collected by maintaining a negative pressure inside the granulator with a fume fan pulling fumes through a venturi scrubber with low pH water (water at a pH lowered by the addition of spent acid from a hot dip galvanizing process) sprayed into the venturi throat. (If galvanizing acid is unavailable, the pH may be controlled with phosphoric or sulfuric acid). The low pH water collects ammonia vapor present in the fumes, as well as dust particles.

Granulated material exits the granulator at about 93° C. (200° F.) and at about a five (5) to fifteen (15) percent moisture content into a rotary dryer. The rotary dryer is approximately two meters (e.g., six (6) feet) in diameter and has a length of about twenty meters (e.g., sixty (60) feet). It has a heating capacity of 30 million BTU/hour, and is associated with a lump crusher or lump breaker at the discharge end. The moisture in the material is reduced to about three percent (3%) by heated forced air in the dryer.

Materials exiting the rotary dryer are run through the lump crusher to reduce oversized material to less than one (1) inch in size.

Screens are used to separate the material into (a) fines, (b) product and (c) oversized material. Fines are returned to the granulator. Product goes to a two meter (six foot) diameter, twenty meter (sixty foot) long cooler and then on to storage, while the oversized material is passed through a grinding mill, and reduced to fines for recycling to the granulator. About two (2) tons (1800 kg) of fine material per ton of product are required in the recycle stream.

Dust-laden air is collected from the dryer, grinding mills, and screens by a fan maintaining negative pressure on all of the equipment. The air is pulled through a cyclone system that removes about 97% of the dust. From the cyclones, the air is passed through a venturi scrubber to remove the remaining dust particles. Air from the venturi scrubber is sent to a large separator chamber, along with the air from the granulator fume scrubber to remove any condensed moisture. The air from these venturi scrubbers is combined and passed through a secondary venturi scrubber. The air then exits through a stack approximately one hundred (100) feet tall. The air is saturated at around 66° C. (150° F.).

The resulting fertilizer is determined to have an NPK value of 12-3-6 (12% nitrogen, 3% phosphate, and 6% potash). It is also homogenous and properly sized for standard application equipment.

References herein to a specific Example or specific embodiments should not be interpreted as limitations to the invention's scope which is determined by the claims.

What is claimed is:

1. A process of treating relatively low analysis organic waste material, said process involving the treatment of the relatively low analysis organic waste material with exothermically reacting acid and base to enhance the relatively low analysis organic waste material's plant nutrient value, the improvement comprising conducting said treatment in a pipe-cross reactor having a center, wherein the pipe-cross reactor comprises a first, second and third cross pipe.

2. The process of claim 1, wherein the pipe-cross reactor feeds into a granulator.

3. The process of claim 1, wherein the relatively low analysis organic waste material is selected from the group consisting of sewage sludge, poultry manure, food processing wastes, wastes from paper manufacturing, swine manure sludge, and mixtures thereof.

4. The process of claim 1, wherein the first and second cross pipe receive sulfuric acid or phosphoric acid.

5. The process of claim 1, wherein the third cross-pipe incorporates ammonia into the center of the reactor.

* * * * *